No. 612,770. Patented Oct. 18, 1898.
F. O. GODMAN.
VEHICLE BRAKE.
(Application filed Sept. 13, 1897.)
(No Model.)
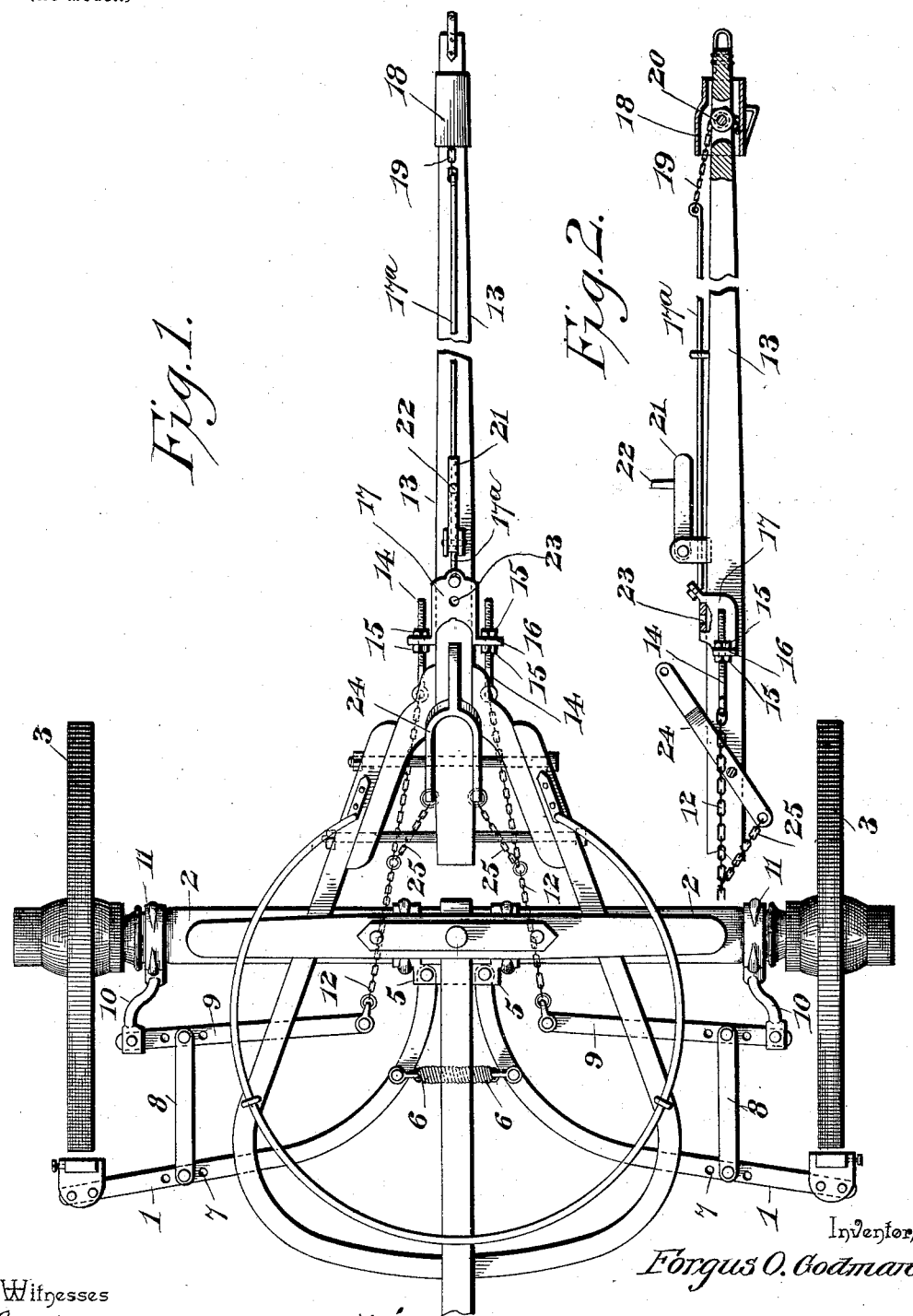

United States Patent Office.

FORGUS O. GODMAN, OF FORT WAYNE, INDIANA, ASSIGNOR, BY DIRECT AND MESNE ASSIGNMENTS, OF FIVE-EIGHTHS TO CHARLES W. BEEKER, OF WEST LAFAYETTE, INDIANA.

VEHICLE-BRAKE.

SPECIFICATION forming part of Letters Patent No. 612,770, dated October 18, 1898.

Application filed September 13, 1897. Serial No. 651,510. (No model.)

*To all whom it may concern:*

Be it known that I, FORGUS O. GODMAN, a citizen of the United States, residing at Fort Wayne, in the county of Allen and State of Indiana, have invented a new and useful Vehicle-Brake, of which the following is a specification.

The invention relates to improvements in automatic vehicle-brakes.

The object of the present invention is to improve the construction of automatic vehicle-brakes and to provide a simple, inexpensive, and efficient one capable of operating against the front wheels of a vehicle and adapted to be operated by hand when desired.

The invention consists in the construction and novel combination and arrangement of parts, as hereinafter fully described, illustrated in the accompanying drawings, and pointed out in the claims hereto appended.

In the drawings, Figure 1 is a plan view of an automatic vehicle-brake constructed in accordance with this invention and shown applied to a portion of a running-gear. Fig. 2 is a longitudinal sectional view of the same.

Like numerals of reference designate corresponding parts in both figures of the drawings.

1 1 designate a pair of rearwardly-diverging curved brake-levers fulcrumed at their front ends, preferably at the center of the front axle 2 of a running-gear, and having their outer ends located in rear of the front wheels 3 and carrying brake-shoes for engaging the same when the brake is applied. A bracket 5 is secured to the rear face of the axle 2 and is provided with perforations for the reception of the pivots which fulcrum the brake-levers 1, and the latter are normally held out of engagement with the wheels by a transversely-disposed spiral spring 6, connecting them near their front ends.

The levers 1 are provided between their ends with perforations 7 and are adjustably connected by links 8 with transverse levers 9, provided with corresponding perforations and fulcrumed at their outer ends on rearwardly-extending arms 10 of clips 11. The clips 11 are mounted upon the front axle, as clearly shown in Fig. 1 of the accompanying drawings, and the clip-plates are extended rearward and slightly deflected laterally to form arms 10. The adjustment of the link-bars 8 enables the leverage to be regulated, so that the desired pressure can be brought upon the front wheels to secure an effective brake.

The inner ends of the transverse levers 9 are attached to the rear ends of chains 12, which extend forward to the rear portion of the pole or tongue 13 and which are connected to adjustable rods 14. The adjustable rods or screws are threaded and provided with nuts 15, disposed in pairs and arranged in advance and in rear of perforated lugs 16 of a slide 17. The slide 17 is mounted upon the rear portion of the tongue, as clearly shown in Fig. 2 of the drawings, and it is provided with depending sides to conform to the configuration of the tongue, the perforated ears extending laterally from the rear terminals of the sides. The adjustable rods or screws enable the brake mechanism to be properly adjusted to take up any slack and cause the brake-shoes to be gradually and effectively applied. The slide is connected with a rod $17^a$, mounted in suitable guides of the pole or tongue and connected at its front end with a sliding sleeve 18, which is adapted to be operated by the neck-yoke of a team. A chain 19 is secured to the front end of the rod $17^a$ and to the interior of the slide 18, and it passes around a pulley 20, which changes the direction of the chain, so that a rearward movement of the sleeve on the tongue will cause an application of the brake. The sliding sleeve extends in advance and in rear of the slot in which the pulley 20 is mounted, and it serves to conceal both the pulley and the slot.

The brake mechanism is locked out of operation during backing by means of a lever 21, fulcrumed on the tongue in advance of the slide and provided with a projection or lug 22, adapted to engage a perforation 23 of the slide to lock the same against longitudinal movement.

A forked lever 24 straddles the rear portion of the tongue and is fulcrumed thereon, with the sides of the forked portion extending below the same and connected with the chains 12 by short chains 25. The shank of the lever 24 may be connected with any suitable mechanism for enabling the brake to be applied by hand.

The invention has the following advantages:

The automatic vehicle-brake is simple and comparatively inexpensive in construction, and it is capable of being readily applied to any ordinary running-gear. It is adapted to operate against the front wheels, and besides being automatically operated by reason of a vehicle advancing on a team in descending a grade it may also be applied by hand.

The brake mechanism, or rather the automatic portion thereof, may be locked out of operation for backing a vehicle or for any other purpose.

The brake may also be operated by hand while the automatic portion or operating mechanism is locked out of operation.

Changes in the form, proportion, and minor details of construction may be resorted to without departing from the spirit or sacrificing any of the advantages of this invention.

What I claim is—

1. In an automatic vehicle-brake, the combination with a running-gear, of a pair of rearwardly-diverging brake-levers fulcrumed at the center of the front axle and arranged to engage the front wheels, clips mounted on the front axle adjacent to the wheels and provided with rearwardly-extending arms, transverse levers fulcrumed at their outer ends on said arms, links connecting the adjacent levers, and operating mechanism connected with the inner ends of the transverse levers, substantially as described.

2. In an automatic vehicle-brake, the combination with a running-gear, of brake-levers fulcrumed thereon and adapted to engage the front wheels, a slide mounted on the tongue and provided with perforated lugs, longitudinal adjusting-screws passing through the lugs and provided with nuts enaging the same to secure the screws at the desired adjustment, connections between the rear ends of the screws and the levers, and a device mounted on the tongue, adapted to be operated by the neck-yoke and connected with the slide, substantially as described.

3. In an automatic vehicle-brake, the combination with a running-gear, of brake-levers fulcrumed thereon, a pulley mounted on the tongue near the front end thereof, a chain passing around the pulley and connected with the brake-levers, and a sliding sleeve mounted on the tongue and concealing the pulley, and connected with said chain, said sliding sleeve being adapted to be engaged by a neck-yoke, substantially as described.

4. In an automatic vehicle-brake, the combination with a running-gear, of brake-levers fulcrumed thereon, a neck-yoke-operated device mounted on the tongue, chains connected with the levers and with the said device, whereby when the latter is operated, the brake will be applied, a forked lever fulcrumed on the tongue independent of the connections between the brake-levers and the neck-yoke-operated device, and flexible connections between the fork of the lever and said chains, substantially as described.

5. In an automatic vehicle-brake, the combination with a running-gear, of a pair of rearwardly-diverging brake-levers fulcrumed at the center of the front axle and arranged to engage the front wheels, mechanism connected with the brake-levers for enabling the same to be automatically applied when the running-gear moves forward on the draft-horses, a locking device for holding the automatic mechanism out of operation, and means for operating the brake-levers by hand, said means being connected with the brake-levers in rear of the locking device, whereby the brake-levers may be operated by hand when the automatic mechanism is in or out of operation, substantially as described.

6. In an automatic vehicle-brake, the combination with a running-gear, of brake-levers fulcrumed thereon and adapted to engage the front wheels, a slide mounted on the tongue and provided with lugs, longitudinal adjusting-screws passing through the lugs and located at opposite sides of the tongue, connections between the rear ends of the screws and the brake-levers, a device mounted on the tongue, adapted to be operated by a neck-yoke and connected with the slide, and a locking device mounted on the tongue and arranged to engage the slide, substantially as described.

In testimony that I claim the foregoing as my own I have hereto affixed my signature in the presence of two witnesses.

FORGUS O. GODMAN.

Witnesses:
CHAS. E. DAVIS,
CHAS. W. BEEKER.